United States Patent
Hawthorne

(10) Patent No.: US 9,565,079 B1
(45) Date of Patent: Feb. 7, 2017

(54) HOLOGRAPHIC STATISTICS REPORTING

(71) Applicant: F5 Networks, Inc., Seattle, WA (US)

(72) Inventor: Jonathan M. Hawthorne, Seattle, WA (US)

(73) Assignee: F5 Networks, Inc., Seattle, WA (US)

(*) Notice: Subject to any disclaimer, the term of this patent is extended or adjusted under 35 U.S.C. 154(b) by 496 days.

(21) Appl. No.: 13/737,962

(22) Filed: Jan. 10, 2013

(51) Int. Cl.
| | |
|---|---|
| *G06F 15/173* | (2006.01) |
| *H04L 12/26* | (2006.01) |
| *H04L 12/24* | (2006.01) |
| *G06F 3/0481* | (2013.01) |

(52) U.S. Cl.
CPC .............. *H04L 43/045* (2013.01); *H04L 41/22* (2013.01); *G06F 3/04815* (2013.01)

(58) Field of Classification Search
CPC .. G06F 11/3433; G06F 3/04815; H04L 41/22; H04L 43/045
See application file for complete search history.

(56) References Cited

U.S. PATENT DOCUMENTS

| | | | |
|---|---|---|---|
| 5,309,355 A | 5/1994 | Lockwood | |
| 5,504,675 A | 4/1996 | Cragun et al. | |
| 6,078,892 A | 6/2000 | Anderson et al. | |
| 6,119,097 A | 9/2000 | Ibarra | |
| 6,477,533 B2 | 11/2002 | Schiff et al. | |
| 6,499,034 B1 * | 12/2002 | Mackinlay | G06F 17/3089 707/999.102 |
| 6,526,044 B1 * | 2/2003 | Cookmeyer, II | H04L 41/142 370/352 |
| 6,618,706 B1 | 9/2003 | Rive et al. | |
| 6,636,852 B2 | 10/2003 | Gozdeck et al. | |
| 6,662,164 B1 | 12/2003 | Koppelman et al. | |
| 7,216,087 B2 | 5/2007 | Thompson et al. | |
| 7,236,944 B1 | 6/2007 | Schwartz et al. | |
| 7,340,410 B1 | 3/2008 | Vaillancourt et al. | |
| 7,360,697 B1 | 4/2008 | Sarkar et al. | |

(Continued)

OTHER PUBLICATIONS

"Available Lead Products; Future Products", ABCLeads.com, Tour, last accessed Jan. 12, 2011, (www.abcleads.com/tour_lead_products.html).

(Continued)

*Primary Examiner* — Mohamed Wasel
(74) *Attorney, Agent, or Firm* — LeClairRyan, a Professional Corporation

(57) ABSTRACT

A system and method for providing real time holographic reporting data of at least a portion of a data center to a user. Initializing a reporting profile of a data center via a network traffic management device, wherein the reporting profile includes a plurality of network sources of the data canter identified by the user to provide reporting information, the reporting profile including a user established policy configured to instruct how to process the reporting information from the identified network sources; receiving reporting information from one or more identified network sources of the data center; compiling the received reporting information of the one or more network sources in conformance with the user established policy; generating network statistics data of the data center based on compiling instructions of the user established policy; generating a report configured to display the generated network statistics data of a user identified portion of the data center.

18 Claims, 5 Drawing Sheets

(56) References Cited

U.S. PATENT DOCUMENTS

| | | | |
|---|---|---|---|
| 7,454,367 | B2 | 11/2008 | Yu et al. |
| 7,483,842 | B1 | 1/2009 | Fung et al. |
| 8,027,871 | B2 | 9/2011 | Williams et al. |
| 8,135,607 | B2 | 3/2012 | Williams et al. |
| 8,260,670 | B2 | 9/2012 | Walker et al. |
| 8,271,313 | B2 | 9/2012 | Williams et al. |
| 8,326,663 | B2 | 12/2012 | Christon et al. |
| 8,326,964 | B1 | 12/2012 | Chourey et al. |
| 8,484,067 | B2 | 7/2013 | Smith |
| 2001/0037250 | A1 | 11/2001 | Lefkowitz |
| 2002/0072957 | A1 | 6/2002 | Thompson et al. |
| 2002/0077998 | A1 | 6/2002 | Andrews et al. |
| 2002/0107761 | A1 | 8/2002 | Kark et al. |
| 2002/0133368 | A1 | 9/2002 | Strutt et al. |
| 2002/0133383 | A1 | 9/2002 | Chao et al. |
| 2002/0188535 | A1 | 12/2002 | Chao et al. |
| 2003/0207687 | A1* | 11/2003 | Svedevall ............ H04W 36/10 455/436 |
| 2004/0039624 | A1 | 2/2004 | Ikezawa et al. |
| 2004/0102926 | A1 | 5/2004 | Adendorff et al. |
| 2004/0143483 | A1 | 7/2004 | Tivey et al. |
| 2004/0236607 | A1 | 11/2004 | Kost et al. |
| 2005/0097000 | A1 | 5/2005 | Freishtat et al. |
| 2005/0144075 | A1 | 6/2005 | Magowan et al. |
| 2005/0165645 | A1 | 7/2005 | Kirwin |
| 2005/0246221 | A1 | 11/2005 | Geritz et al. |
| 2005/0262237 | A1* | 11/2005 | Fulton ................ H04L 43/0882 709/224 |
| 2006/0010082 | A1 | 1/2006 | Gee et al. |
| 2006/0031178 | A1 | 2/2006 | Lehrman et al. |
| 2006/0047715 | A1 | 3/2006 | Parizeau |
| 2006/0242000 | A1 | 10/2006 | Giguiere |
| 2006/0242282 | A1* | 10/2006 | Mullarkey .......... H04L 41/5003 709/223 |
| 2007/0027746 | A1 | 2/2007 | Grabowich |
| 2007/0094086 | A1 | 4/2007 | Ikezawa et al. |
| 2007/0129993 | A1 | 6/2007 | Alvin |
| 2007/0226026 | A1 | 9/2007 | Chang et al. |
| 2007/0233561 | A1 | 10/2007 | Golec |
| 2007/0239514 | A1 | 10/2007 | Lissy et al. |
| 2007/0265928 | A1 | 11/2007 | Fuchs et al. |
| 2007/0282650 | A1 | 12/2007 | Jackness et al. |
| 2008/0004929 | A9 | 1/2008 | Raffel et al. |
| 2008/0077459 | A1 | 3/2008 | Desai et al. |
| 2008/0103946 | A1 | 5/2008 | Johnson et al. |
| 2008/0126264 | A1 | 5/2008 | Tellefsen et al. |
| 2008/0162487 | A1 | 7/2008 | Richter |
| 2008/0235155 | A1 | 9/2008 | Thywissen |
| 2008/0250356 | A1* | 10/2008 | Johns ................. G06F 3/04815 715/853 |
| 2008/0316922 | A1* | 12/2008 | Riddle ............... H04L 41/0893 370/230 |
| 2009/0030829 | A1 | 1/2009 | Chatter et al. |
| 2010/0280867 | A1 | 11/2010 | Diaz et al. |
| 2010/0324965 | A1 | 12/2010 | Croix et al. |
| 2011/0119276 | A1 | 5/2011 | Borghetti et al. |
| 2011/0161134 | A1 | 6/2011 | Adkins et al. |
| 2011/0178861 | A1 | 7/2011 | Georgi |
| 2011/0258016 | A1 | 10/2011 | Barak et al. |
| 2011/0307347 | A1 | 12/2011 | Jentsch |
| 2012/0197705 | A1 | 8/2012 | Mesaros |
| 2012/0263072 | A1* | 10/2012 | Wu .................... H04L 41/26 370/253 |
| 2014/0013432 | A1* | 1/2014 | Yi ..................... H04L 63/1416 726/23 |
| 2015/0220836 | A1* | 8/2015 | Wilson ............... G06Q 30/0631 706/46 |

OTHER PUBLICATIONS

"Frequently Asked Questions", ABCLeads.com, Frequently Asked Questions, last accessed Jan. 12, 2011, pp. 1-3, (www.abcleads.com/frequently_asked_questions.html).

"Getting Started", ABCLeads.com, Tour, last accessed Jan. 12, 2011, (www.abcleads.com/tour_getting_started.html).

"How ABCLeads.com Connects buyers and Sellers", ABCLeads.com, Tour, last accessed Jan. 12, 2011, (www. abcleads.com/tour_buyers_sellers.html).

"How does ABCLeads.com Generate Leads?", ABCLeads.com, How does ABCLeads.com Generate Leads?, last accessed Jan. 12, 2011, pp. 1-2, (www.abcleads.com/lead_generation.html).

"How Does the "Lead Shop" Service Work?", ABCLeads.com, Lead Shop Information, last accessed Jan. 12, 2011, pp. 1-3, (www.abcleads.com/leadshopinfo.html).

"How Does the "Live Leads" Service Work?", ABCLeads.com, Live Lead Information, last accessed Jan. 12, 2011, pp. 1-4, (www.abcleads.com/live/leadinfo.html).

"Lead Types", ABCLeads.com, Lead Types, last accessed Jan. 12, 2011, (www.abcleads.com/lead_types.html).

Moran, Alane, "F5 Launches Powerful Incentive and Rewards Program for TrafficShield™ and FirePass® Resellers", F5 Networks Inc., Press Release, Dec. 13, 2004, pp. 1-2, Seattle, WA.

Moran, Alane, "F5 Networks Broadens Partner Opportunities with New and Updated Channel Support", F5 Networks Inc., Press Release, Mar. 22, 2004, pp. 1-2, Seattle, WA.

F5 Networks Inc., "Partner Update", F5 Networks Inc., Newsletter, Nov. 22, 2005, pp. 1-6, Seattle WA.

"Service Information", ABCLeads.com, Service Information, last accessed Jan. 12, 2011, (www.abcleads.com/service_information.html).

"We offer Two Great Options to generate Leads for you", Exclusive Life Insurance Leads, Sales for Long Term Care, Disability, Annuity, Health, last accessed Jan. 12, 2011, (www.abcleads.com/index.html).

"Welcome to the ABCLeads.com Tour!", ABCLeads.com, Tour, last accessed Jan. 12, 2011, (www.abcleads.com/tour_start.html).

"Why ABCLeads.com?", ABCLeads.com, Tour, last accessed Jan. 12 ,2011, (www.abcleads.com/tour_why_leads.html).

IBM Corporation, "A Progressive Strategy for Trade Customer Price", IBM Global Business Services Executive Summary, IBM United Kingdom Limited, 2009.

Basuroy S., et al., "The Impact of Category Management on Retailer Prices and Performance: Theory and Evidence", Journal of Marketing, vol. 65, Oct. 2001, pp. 16-32.

Gal-Or E., "Pricing Practices of Resellers in the Airline Industry: Posted Price vs. Name-Your-Own-Price Mechanisms", Jan. 2009, Graduate School of Business, University of Pittsburgh, Pittsburgh, PA.

Strategic Economics, "Fremont Market Analysis and Retail Strategy", City of Fremont, vol. 49, No. 1, Sep. 2008.

Kolay S., et al., "All-units Discounts in Retail Contracts", pp. 1-35, Aug. 2002.

"Retailer and Wholesaler Standard Industry Guide", Florida Department of Revenue, Aug. 1, 2010.

\* cited by examiner

HOLOGRAPHIC STATISTICS REPORTING

FIELD

This technology generally relates to a system and method of providing holographic statistics reporting.

BACKGROUND

Network systems, in general, are made up of several different hardware and software components or "nodes" in a clustered system. Health monitoring of the entire network system is a difficult task as the various nodes, as in the clustered system, are required to fully contribute reporting data independently of one another to one or more health diagnostic modules. However, there is no known method which automatically aggregates reporting data from certain correlated nodes while ensuring that data from certain other nodes are kept separate so that multiple levels of detail of the data for the network can be generated and viewed in a well organized manner.

What is needed is a statistics and/or fault system and method that is configured to represent network condition information for a partial or entire network clustered system via a unified visual or holographic user interface.

Figure 1:
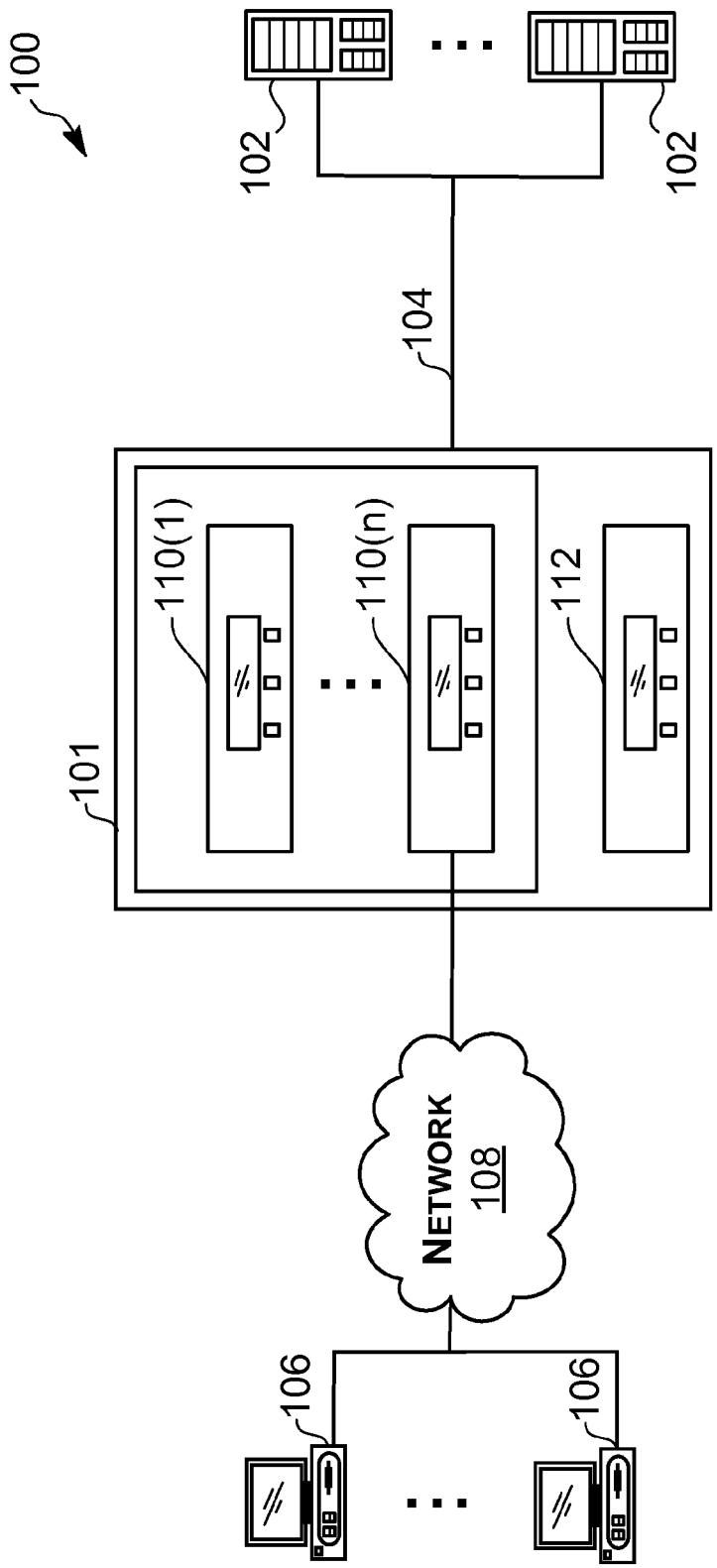
FIG. 1 is a diagram of an example system environment that includes a network traffic management device in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

SUMMARY

A method for providing real time holographic reporting data of at least a portion of a data center to a user. The method includes initializing a reporting profile of a data center via a network traffic management device. The reporting profile includes a plurality of network sources of the data canter identified by the user to provide reporting information. The reporting profile includes a user established policy configured to instruct how to process the reporting information from the identified network source. The method includes receiving reporting information from one or more identified network sources of the data center. The method includes compiling the received reporting information of the one or more network sources in conformance with the user established policy. The method includes generating network statistics data of the data center based on compiling instructions of the user established policy. The method includes generating a report configured to display, via a user interface, the generated network statistics data of a user identified portion of the data center.

In an aspect, a processor readable medium having stored thereon instructions for providing real time holographic reporting data of at least a portion of a data center to a user is disclosed. Machine executable code which when executed by at least one processor, causes the processor to initialize a reporting profile of a data center via a network traffic management device, wherein the reporting profile includes a plurality of network sources of the data canter identified by the user to provide reporting information. The reporting profile including a user established policy configured to instruct how to process the reporting information from the identified network sources. The processor is configured to receive reporting information from one or more identified network sources of the data center. The processor is configured to compile the received reporting information of the one or more network sources in conformance with the user established policy. The processor is configured to generate network statistics data of the data center based on compiling instructions of the user established policy. The processor is configured to generate a report configured to display, via a user interface, the generated network statistics data of a user identified portion of the data center.

In an aspect, a network traffic management device includes a network interface configured to communicate with one or more network sources over a network; a memory containing non-transitory machine readable medium comprising machine executable code having stored thereon instructions for providing real time holographic reporting data of at least a portion of a data center to a user; and a processor coupled to the network interface and the memory. The processor is configured to execute the code which causes the processor to initialize a reporting profile of a data center via a network traffic management device. The reporting profile includes a plurality of network sources of the data canter identified by the user to provide reporting information. The reporting profile includes a user established policy configured to instruct how to process the reporting information from the identified network sources. The processor is configured to receive reporting information from one or more identified network sources of the data center. The processor is configured to compile the received reporting information of the one or more network sources in conformance with the user established policy. The processor is configured to generate network statistics data of the data center based on compiling instructions of the user established policy. The processor is configured to generate a report configured to display, via a user interface, the generated network statistics data of a user identified portion of the data center.

In one or more of the above aspects, user selection is received to view network statistics data of at least a user identified portion of the data center in a user selected display format.

In one or more of the above aspects, the policy includes correlation information between a plurality of network sources for an identified reporting field of the reporting information.

In one or more of the above aspects, the policy includes instructions to perform a logic operation on data values of corresponding reporting fields of a plurality of network sources.

In one or more of the above aspects, the logic operation is an aggregation operation of the data values in the corresponding reporting fields.

In one or more of the above aspects, the processor, when generating the network statistics data, applies mapping metadata to generated network statistics data, wherein the metadata includes network source information and reporting field description information.

In one or more of the above aspects, prior to generating the report, the processor is further configured to: determine that the user selected a specific graphical object associated with viewing the report on the network statistics data in a desired display format and locate the network statistics data from the reporting profile using the reporting field description and network source information, wherein the reporting field description and network source information are mapped to the specific selected graphical object.

DETAILED DESCRIPTION

FIG. 1 is a diagram of an example system environment that includes a network traffic management device with a reporting module in accordance with an aspect of the present disclosure. The example system environment 100 includes one or more Web and/or non Web application servers 102 (referred generally as "servers"), one or more client devices 106 and one or more data centers 101 including a cluster of network traffic management devices (termed herein as network sources) 110, although the environment 100 can include other numbers and types of devices in other arrangements. The network traffic management devices 110 are coupled to the servers 102 via local area network (LAN) 104 and client devices 106 via a wide area network 108. Generally, client device requests are sent over the network 108 to the servers 102 which are received or intercepted by the network traffic management device 110.

A network traffic management device 112 which includes a reporting module 210 (FIG. 2) which communicates with the network sources 110 of the one or more data centers. It should be noted, however, that the reporting module 210 need not be on a separate device 112 and thus can be implemented on one or more of the devices 110 in the data center 101.

Client devices 106 comprise network computing devices capable of connecting to other network computing devices, such as network traffic management device 110 and/or servers 102. Such connections are performed over wired and/or wireless networks, such as network 108, to send and receive data, such as for Web-based requests, receiving server responses to requests and/or performing other tasks. Non-limiting and non-exhausting examples of such client devices 106 include personal computers (e.g., desktops, laptops), tablets, smart televisions, video game devices, mobile and/or smart phones and the like. In an example, client devices 106 can run one or more Web browsers that provide an interface for operators, such as human users, to interact with for making requests for resources to different web server-based applications and/or Web pages via the network 108, although other server resources may be requested by client devices.

The servers 102 comprise one or more server network devices or machines capable of operating one or more Web-based and/or non Web-based applications that may be accessed by other network devices (e.g. client devices, network traffic management devices) in the environment 100. The servers 102 can provide web objects and other data representing requested resources, such as particular Web page(s), image(s) of physical objects, JavaScript and any other objects, that are responsive to the client devices' requests. It should be noted that the servers 102 may perform other tasks and provide other types of resources. It should be noted that while only two servers 102 are shown in the environment 100 depicted in FIG. 1, other numbers and types of servers may be utilized in the environment 100. It is contemplated that one or more of the servers 102 may comprise a cluster of servers managed by one or more network traffic management devices 110. In one or more aspects, the servers 102 may be configured implement to execute any version of Microsoft® IIS server, RADIUS server, DIAMETER server and/or Apache® server, although other types of servers may be used.

Network 108 comprises a publicly accessible network, such as the Internet, which is connected to the servers 102, client devices 106, and network traffic management devices 110. However, it is contemplated that the network 108 may comprise other types of private and public networks that include other devices. Communications, such as requests from clients 106 and responses from servers 102, take place over the network 108 according to standard network protocols, such as the HTTP, UDP and/or TCP/IP protocols, as well as other protocols. As per TCP/IP protocols, requests from the requesting client devices 106 may be sent as one or more streams of data packets over network 108 to the network traffic management device 110 and/or the servers 102. Such protocols can be utilized by the client devices 106, network traffic management device 110 and the servers 102 to establish connections, send and receive data for existing connections, and the like.

Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols. Network devices such as client devices, 106, servers 102, network traffic management devices 110, routers, switches, hubs, gateways, bridges, cell towers and other intermediate network devices may act within and between LANs and other networks to enable messages and other data to be sent between network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. Thus, the network 108 is configured to handle any communication method by which data may travel between network devices.

LAN 104 comprises a private local area network that allows communications between the one or more network traffic management devices 110 and one or more servers 102 in the secured network. It is contemplated, however, that the LAN 104 may comprise other types of private and public networks with other devices. Networks, including local area networks, besides being understood by those skilled in the relevant arts, have already been generally described above in connection with network 108 and thus will not be described further.

As shown in the example environment 100 depicted in FIG. 1, the one or more network traffic management devices 110 is interposed between client devices 106 with which it communicates with via network 108 and servers 102 with which it communicates with via LAN 104. Generally, the network traffic management device 110 manages network communications, which may include one or more client requests and server responses, via the network 108 between the client devices 106 and one or more of the servers 102. In any case, the network traffic management device 110 may manage the network communications by performing several network traffic related functions involving the communications. Some functions include, but are not limited to, load balancing, access control, and validating HTTP requests using JavaScript code that are sent back to requesting client devices 106.

Figure 2:
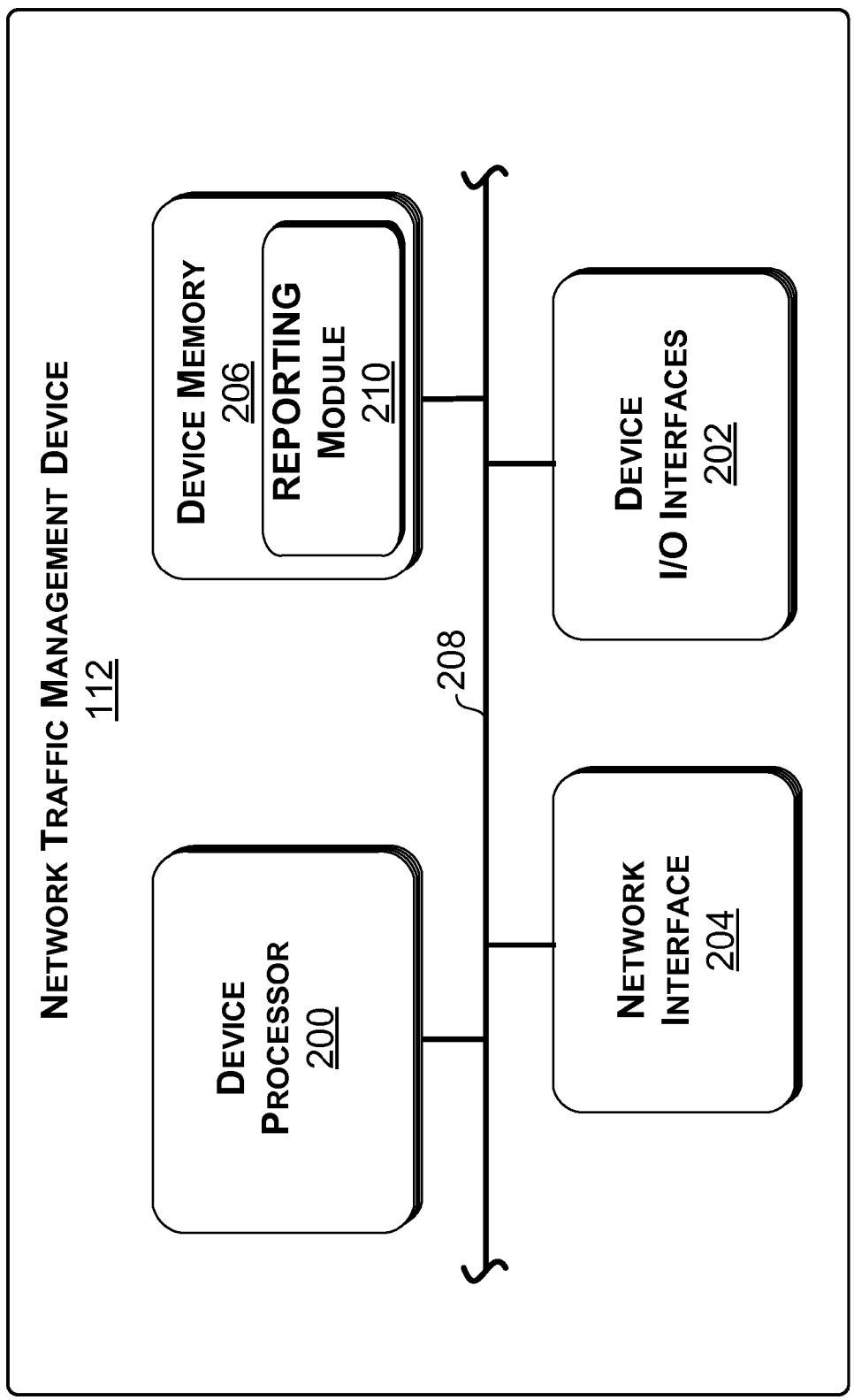
FIG. 2 is a block diagram of the network traffic management device having a reporting module in accordance with an aspect of the present disclosure.

FIG. 2 is a block diagram of the network traffic management device shown in FIG. 1 in accordance with an aspect of the present disclosure. As shown in FIG. 2, the example network traffic management device 110 (or 112 as shown in FIG. 2) includes one or more device processors 200, one or more device I/O interfaces 202, one or more network interfaces 204, and one or more device memories 206, which are coupled together by one or more bus 208. It should be noted that the network traffic management device 110 can be configured to include other types and/or numbers of components and is thus not limited to the configuration shown in FIG. 2.

The network traffic management device 110 or 112 includes a reporting module 210 which communicates with the network sources 110 of the one or more data centers. It should be noted, however, that the reporting module 210 need not be on a separate device 112 and thus can be implemented on one or more of the devices 110 in the data center 101.

Device processor 200 of the network traffic management device 110 comprises one or more microprocessors configured to execute computer/machine readable and executable instructions stored in the device memory 206. Such instructions, when executed by one or more processors 200, implement general and specific functions of the network traffic management device 110, including the inventive process described in more detail below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured according to the teachings as described and illustrated herein.

Device I/O interfaces 202 comprise one or more user input and output device interface mechanisms. The interface may include a computer keyboard, mouse, touch screen display device, and the corresponding physical ports and underlying supporting hardware and software to enable the network traffic management device 110 to communicate with other network devices in the environment 100. Such communications may include accepting user data input and providing user output, although other types and numbers of user input and output devices may be used. Additionally or alternatively, as will be described in connection with network interface 204 below, the network traffic management device 110 may communicate with the outside environment for certain types of operations (e.g. smart load balancing) via one or more network management ports.

Network interface 204 comprises one or more mechanisms that enable the network traffic management device 110 to engage in network communications over the LAN 104 and the network 108 using one or more of a number of protocols, such as TCP/IP, HTTP, UDP, RADIUS and DNS. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as the LAN 104 and the network 108. In an example, where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110 or client request/server response related data.

Bus 208 may comprise one or more internal device component communication buses, links, bridges and supporting components, such as bus controllers and/or arbiters. The bus 208 enables the various components of the network traffic management device 110, such as the processor 200, device I/O interfaces 202, network interface 204, and device memory 206, to communicate with one another. However, it is contemplated that the bus 208 may enable one or more components of the network traffic management device 110 to communicate with one or more components in other network devices as well. Example buses include Hyper-Transport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 206 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information, which can be accessed by a computing or specially programmed network device, such as the network traffic management device 110.

Such storage media includes computer readable/processor-executable instructions, data structures, program modules, or other data, which may be obtained and/or executed by one or more processors, such as device processor 200. Such instructions, when executed, allow or cause the processor 200 to perform actions, including performing the inventive processes described below. The memory 206 may contain other instructions relating to the implementation and operation of an operating system for controlling the general operation and other tasks performed by the network traffic management device 110.

In general, the present disclosure is directed to a system and method which receives statistics and fault logging data from multiple nodes in which the system and utilizes pre-programmed logic to selectively compile and organize, in real time, the received data into network condition information that is output via a computer display in a visual, holographic graphical format in conformance with a user selected resolution.

Figure 3:
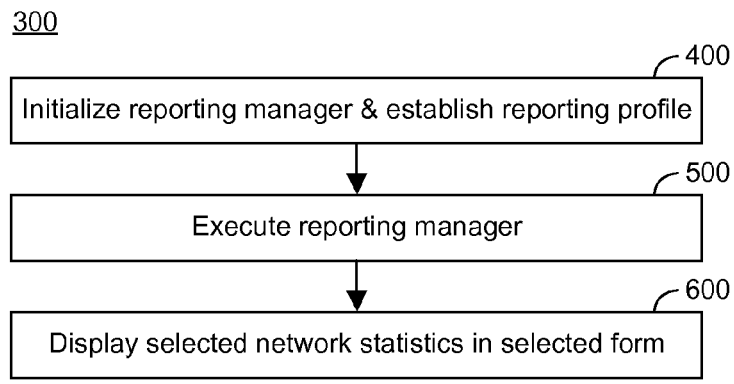
FIG. 3 illustrates a flow chart describing a process performed by the reporting module in accordance with an aspect of the present disclosure.

FIG. 3 illustrates a flow chart describing a process performed by the reporting module in accordance with an aspect of the present disclosure. As shown in FIG. 3, the process (Block 300) includes initializing the reporting manager for operating with the network sources of one or more data centers 101, and establishing an associated reporting profile (Block 400).

Figure 4:
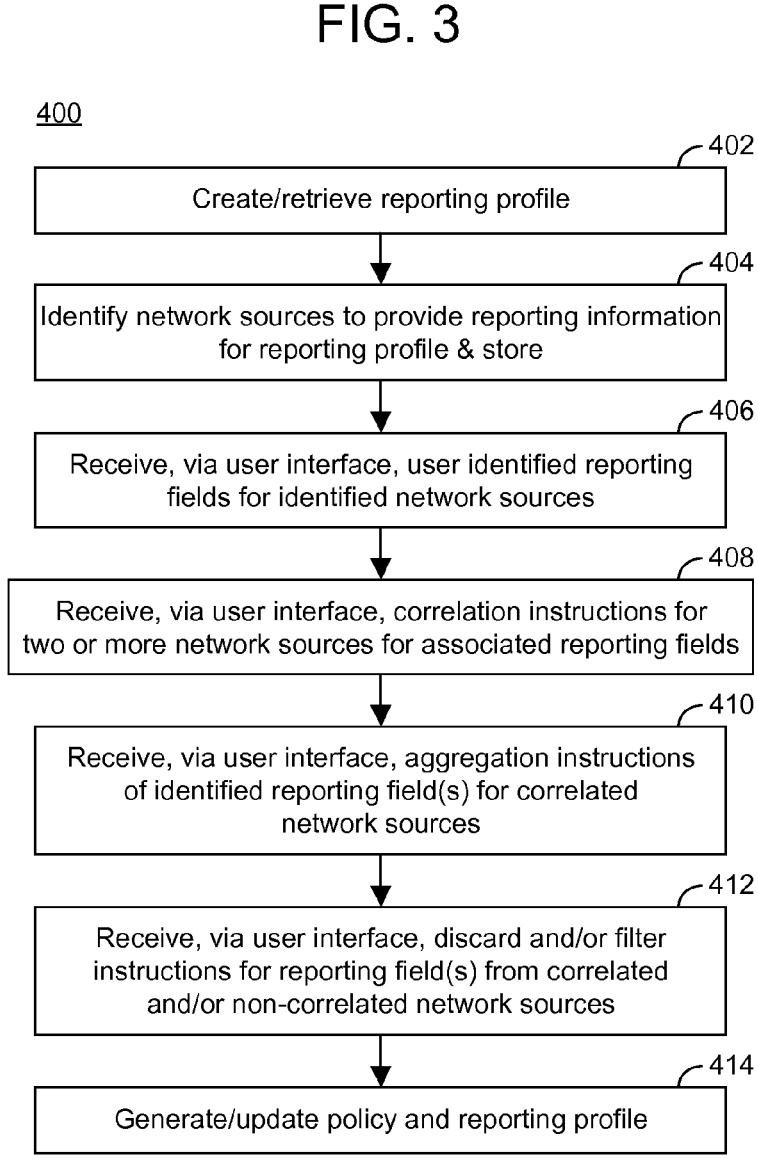
FIG. 4 illustrates a flow chart describing a process performed by the reporting module in accordance with an aspect of the present disclosure.

FIG. 4 illustrates a flow chart describing a process performed by the reporting module in accordance with an aspect of the present disclosure. As shown in FIG. 4, the process (Block 400) proceeds in which the reporting module 210 creates a new or retrieves an existing reporting profile from memory (Block 402).

In an aspect, the reporting module 210 is provided information that identifies the network sources 110 of one or more data centers 101 which are to provide reporting information to the reporting module 210 (Block 404). In an aspect, the identifying information is entered via the reporting module's 210 user interface by a network administrator or other user. Additionally or alternatively, the identifying information can be automatically retrieved by the reporting module 210 from the network sources 110 themselves or from another database. The identifying information may include specification information of the network sources (e.g. class, model number, number of cores, energy rating, manufacturer info, make/model information of other network devices which the device is compatible with). The identifying information may also include the location of the data center where the network source is located, the specific rack where the network source is located as well as that source's specific location within the rack. This information is stored in the reporting profile for use during the reporting process (Block 600).

The reporting module 210 is provided, via the user interface, information that identifies one or more specific reporting fields associated with performance and/or operational status reporting information that the network sources 110 are to provide to the reporting module 210 (Block 406). Such reporting fields can include, but are not limited to, number of connections being handled by the network source over a user designated period of time; number of objects allocated to the network source at a particular time; temperature information; energy consumption information; bit rate information; traffic load; bandwidth information; RTT information; health information of the network source itself and/or servers 102 with which it is communicating with; as well as other hardware and/or software operational status and/or health data.

As shown in FIG. 4, the reporting module 210 thereafter receives, via the user interface, correlation or non-correlation instructions with regard to one or more reporting fields for one or more network sources 110 for generating a user established policy rule (Block 408). For example, the user may select two network sources (e.g. two device blades) to have a correlation relationship with respect to the reporting field for temperature data whereas those same two device blades may, based on the user's selection, not be correlated with respect to the reporting field for energy consumption data. In another example, the user may, via the user interface, indicate that all reporting information provided by a certain network traffic management device in the same data center of the other two blades mentioned above should be provided independently of any other network source (thereby non-correlating network source).

The reporting module 210 thereafter receives aggregation or other logic operation instructions from the user, via the user interface, for one or more reporting fields (Block 410). Such logic operations include, but are not limited to, aggregating the data values for the correlated network sources 110 for the specific reporting field; summing the data values; choosing the higher value among the correlated sources 110; choosing the lower value among the correlated sources 110; performing XOR operations and the like.

The reporting module 210 receives, via the user interface, instructions for discarding and/or filtering data with respect to identified reporting field(s) for identified network source(s) 110 (Block 412). This process is repeatable to allow the reporting module 210 to receive all the user's desired instructions for purposes of reviewing network statistics of the network sources 110 associated with the reporting profile. The reporting module 210 thereafter generates or updates the policy to include the user's instructions for the reporting profile, wherein the policy is then stored in memory (Block 414).

Figure 5:
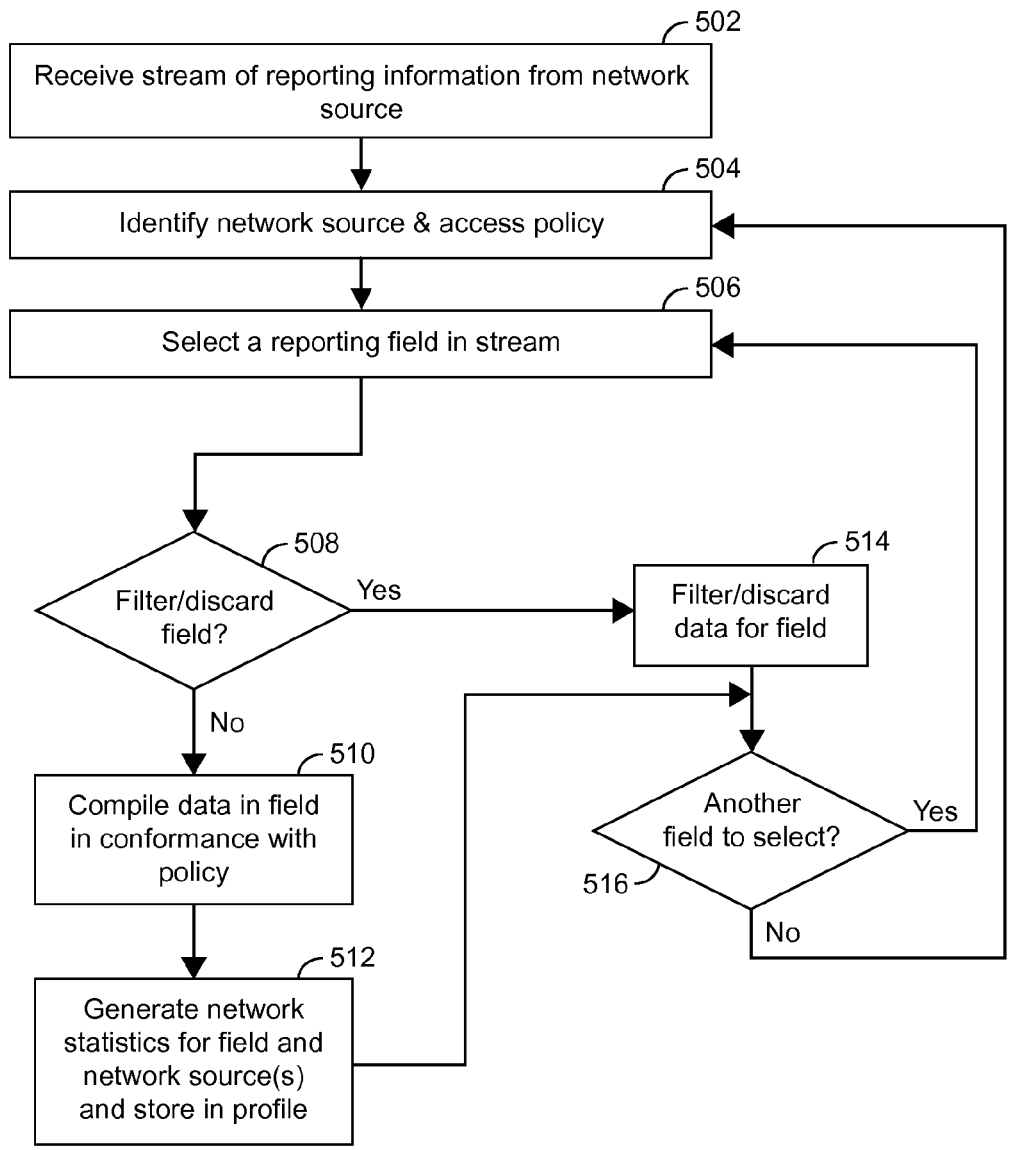
FIG. 5 illustrates a flow chart describing a process performed by the reporting module in accordance with an aspect of the present disclosure.

Referring back to FIG. 3, once the reporting profile is stored and ready to be implemented, the reporting module 210 is executed (Block 500). FIG. 5 illustrates a flow chart describing a process performed by the reporting module in accordance with an aspect of the present disclosure. As shown in FIG. 5, the process (Block 500) proceeds in which the reporting module 210 receives a stream of reporting information from one or more network sources 110 (Block 502). The reporting information contains information identifying the network source (e.g. blade, core, network interface) as well as contains a plurality of reporting fields, each of which contains data identifying the type of information the field is associated with as well as the actual value(s) quantifying the identified information.

For instance, the data may be health status data of the source; network traffic processing data; health status data of other network devices (e.g. servers, clients); connection data for a certain amount of time (e.g. number of open, closed, pending); total amount of objects allocated; temperature information; energy consumption information; identifying non-responsive or failing hardware devices and/or software components of the node; processing state information; core status information; daemon status information and overall health information of the source and the like.

The reporting module 210 parses the reporting information to identify the network source that transmitted the reporting information (Block 504). Additionally, the reporting module 210 accesses the reporting profile as well as the user established policy information to allow the reporting module 210 to process the reporting information in conformance with the user's instructions.

The reporting module 210 selects one or more reporting fields in the stream (Block 506). If the policy indicates that the particular selected reporting field is to be filter/discarded (Block 508), the reporting module 210 filters/discards the data in that field (Block 514). The reporting module 210 thereafter determines whether there is another reporting field to select in the stream (Block 516). If there is another reporting field to select, the process proceeds back to Block 506. Otherwise, the process proceeds to Block 504.

Returning back to Block 508, if the reporting module 210 determines that the selected field is not to be discarded, the reporting module 210 compiles the data in the selected field in conformance with the policy's instructions (Block 510). In an aspect, the reporting module 210 determines from the policy that the source 110 is correlated with one or more other network sources 110 for that field, wherein the reporting module 210 performs a logic operation on the data with one or more other network source's 110 data for that reporting field. In another aspect, if the policy instructs the reporting module 210 that the network source is not correlated with another source 110 for that field, the reporting module 210 generates the network statistic (see below) for the data and stores it in the reporting profile. It should be noted that the policy may be configured to instruct the reporting module 210 to perform additional and/or different functions on the data in the selected field.

In processing the data, as instructed by the policy, the reporting module 210 will generate a network statistic based on the compiling step in Block 510 for the reporting field and stores in the reporting profile in memory (Block 512). In an aspect, the reporting module 210 in generating the network statistics, applies metadata to the network statistics which identifies the source, via a source keying system, as well as a description information that is mapped to displayed graphical options that the user can view and select. As discussed below, this allows the reporting module 210 to quickly and effectively locate and retrieve relevant network statistic(s) from the reporting profile in response to the user wanting to see a report for that statistic.

Figure 6:
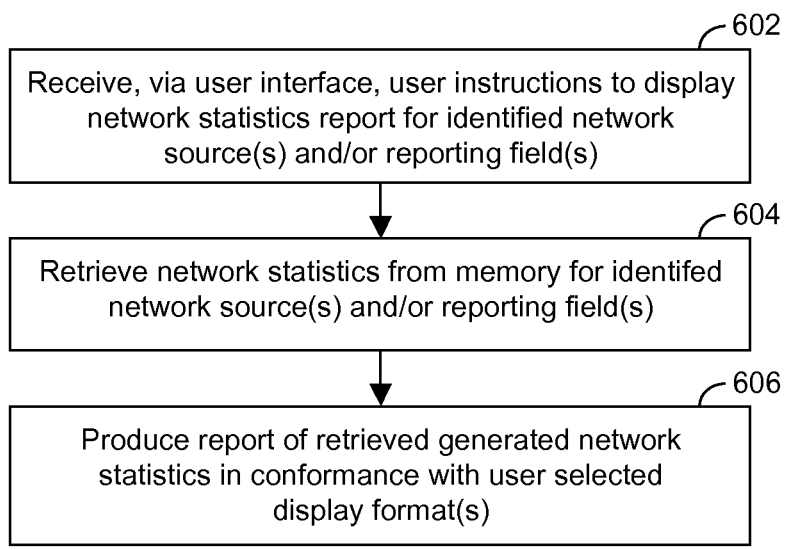
FIG. 6 illustrates a flow chart describing a process performed by the reporting module in accordance with an aspect of the present disclosure.

Referring back to FIG. 3, the reporting module 210 is instructed to display selected network statistics to the user, via the user interface, in a display format chosen by the user (Block 600). FIG. 6 illustrates a flow chart describing a process performed by the reporting module in accordance with an aspect of the present disclosure. As shown in FIG. 6, the process (Block 600) proceeds where the reporting module 210 receives, via the user interface, a user selection to provide a report of one or more network statistics for at least a portion of one or more data centers (Block 602).

As mentioned above, the reporting module 210 in generating the network statistics, applies metadata to the network statistics which identifies the source, via a source keying system, as well as a description information that is mapped to displayed graphical options that the user can view and select. In an example, the reporting module 210 displays selectable links, buttons, or other graphical objects which have a corresponding description (e.g. "See temperature data").

Once the user selects on the particular object, the reporting module 210 accesses the reporting profile and quickly and effectively locates and retrieves the relevant network statistic(s) using the mapped metadata information (Block 604).

The reporting module 210 thereafter is able to convert or otherwise process the network statistic data into a display format that is selected by the user via the interface, wherein the data is reported out via the display screen to the user (Block 606). In an aspect, the display format can be one or more graphs in any desired format (e.g. recursive, hierarchical, ordered, not ordered, acyclic), charts, histograms, tables, charts, numerical values and the like. In an aspect, the reporting module 210 is able to display a 2-D or 3-D rendering of an interior of a data center in which the network sources are displayed in their accurate locations in displayed server racks. In an aspect, as the reporting module 210 receives updated reporting information from one or more network sources 110, the updated information can be implemented dynamically on the displayed report as the user is viewing it on the screen. It is contemplated that the user can change the resolution or granularity of the statistical data that s/he wants to view in the report. The reporting module 210 is configured to dynamically retrieve and display the corresponding network statistic information in response to the level of detail desired by the user.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed system and/or processes to any order except as may be specified in the claims. Accordingly, the system and method is limited only by the following claims and equivalents thereto.

What is claimed is:

1. A method for providing real time holographic reporting data of at least a portion of a data center implemented by a system comprising one or more network traffic management computing devices, one or more server devices, or one or more client devices, the method comprising:
   initializing a reporting profile comprising reporting fields, an indication of each of a plurality of network sources, and correlation data, the correlation data defining one or more correlated ones of the reporting fields for a subset of the network sources;
   receiving reporting data from the subset of the plurality of network sources;
   mapping the reporting data to corresponding ones of the reporting fields and the subset of the plurality of network sources;
   generating network statistics data based on an aggregation of at least a portion of the reporting data corresponding to the one or more correlated ones of the reporting fields in the correlation data of the reporting profile; and
   generating and outputting a report comprising at least the generated network statistics data.

2. The method of claim 1, further comprising:
   selecting at least a portion of the network statistics data for presentation in a specific display format.

3. The method of claim 1, wherein the generating the network statistics data further comprises:
   applying mapping metadata to the generated network statistics data, wherein the metadata comprises network source data and reporting field description data.

4. The method of claim 3, comprising:
   determining when a specific graphical object associated with the network statistics data is presented in a desired display format;
   locating the network statistics data from the reporting profile based on the reporting field description data and network source data, wherein the reporting field description and network source information are mapped to the specific selected graphical object.

5. The method of claim 1, wherein the reporting profile further comprises a data policy comprising instructions for mapping the reporting fields to the corresponding reporting data.

6. The method of claim 5, wherein the data policy includes instructions to perform a logic operation on data values of the correlated ones of the reporting fields for the subset of the plurality of network sources.

7. A non-transitory processor readable medium having stored thereon instructions for providing real time holographic reporting data of at least a portion of a data center, comprising machine executable code which when executed by at least one processor, causes the processor to perform steps comprising:
- initializing a reporting profile comprising reporting fields, an indication of each of a plurality of network sources, and correlation data, the correlation data defining one or more correlated ones of the reporting fields for a subset of the network sources;
- receiving reporting data from the subset of the plurality of network sources;
- mapping the reporting data to corresponding ones of the reporting fields and the subset of the plurality of network sources;
- generating network statistics data based on an aggregation of at least a portion of the reporting data corresponding to the one or more correlated ones of the reporting fields in the correlation data of the reporting profile; and
- generating and outputting a report comprising at least the generated network statistics data.

8. The medium of claim 7, further having stored thereon instructions that when executed by the processor cause the processor to perform steps further comprising:
- selecting at least a portion of the network statistics data for presentation in a specific display format.

9. The medium of claim 7, wherein the processor, when generating the network statistics data,
- applying mapping metadata to generated network statistics data, wherein the metadata includes network source information and reporting field description information.

10. The medium of claim 9, further having stored thereon instructions that when executed by the processor cause the processor to perform steps further comprising:
- determining when a specific graphical object associated with the network statistics data is presented in a specific display format; and
- locating the network statistics data from the reporting profile based on the reporting field description and network source information, wherein the reporting field description data and network source data are mapped to the specific graphical object.

11. The medium of claim 7, wherein the reporting profile further comprises a data policy comprising instructions for mapping the reporting fields to the corresponding reporting data.

12. The medium of claim 11, wherein the data policy includes instructions to perform a logic operation on data values of the correlated ones of the reporting fields for the subset of the plurality of network sources.

13. A network traffic management device comprising a memory comprising programmed instructions stored in the memory and a processor coupled to the memory and configured to be capable of executing the programmed instructions stored in the memory to:
- initialize a reporting profile comprising reporting fields, an indication of each of a plurality of network sources, and correlation data, the correlation data defining one or more correlated ones of the reporting fields for a subset of the network sources;
- receive reporting data from the subset of the plurality of network sources;
- map the reporting data to corresponding ones of the reporting fields and the subset of the plurality of network sources;
- generate network statistics data based on an aggregation of at least a portion of the reporting data corresponding to the one or more correlated ones of the reporting fields in the correlation data of the reporting profile; and
- generate and output a report comprising at least the generated network statistics data.

14. The network traffic management device of claim 13, wherein the processor is further configured to be capable of executing the programmed instructions to:
- select at least a portion of the network statistics data for display in a specific display format.

15. The network traffic management device of claim 13, wherein the processor is further configured to be capable of executing the programmed instructions to:
- apply mapping metadata to the generated network statistics data, wherein the metadata comprises network source data and reporting field description data.

16. The network traffic management device of claim 15, wherein the processor is further configured to be capable of executing the programmed instructions to:
- determine when a specific graphical object associated with viewing the report on the network statistics data is presented in a specific display format;
- locate the network statistics data from the reporting profile based on the reporting field description data and network source data, wherein the reporting field description data and network source data are mapped to the specific graphical object.

17. The network traffic management device of claim 13, wherein the reporting profile further comprises a data policy comprising instructions for mapping the reporting fields to the corresponding reporting data.

18. The network traffic management device of claim 17, wherein the data policy includes instructions to perform a logic operation on data values of the correlated ones of the reporting fields for the subset of the plurality of network sources.

* * * * *